(12) United States Patent
Lo

(10) Patent No.: US 6,915,077 B2
(45) Date of Patent: Jul. 5, 2005

(54) SYSTEM AND METHOD FOR INCREASING CHANNEL CAPACITY OF FIBER-OPTIC COMMUNICATION NETWORKS

(76) Inventor: Victor Yeeman Lo, 1212 Masline St., Covina, CA (US) 91722

( * ) Notice: Subject to any disclaimer, the term of this patent is extended or adjusted under 35 U.S.C. 154(b) by 336 days.

(21) Appl. No.: 10/029,599

(22) Filed: Dec. 20, 2001

(65) Prior Publication Data

US 2002/0067883 A1 Jun. 6, 2002

Related U.S. Application Data

(63) Continuation of application No. PCT/US01/21062, filed on Jun. 29, 2001.
(60) Provisional application No. 60/217,136, filed on Jul. 10, 2000.

(51) Int. Cl.[7] .............................................. G02B 6/27
(52) U.S. Cl. ........................... 398/47; 398/65; 398/79; 398/184
(58) Field of Search ........................ 398/75, 43, 52, 398/45–48, 53, 65, 74, 79, 102, 152, 182, 183–186, 187, 188, 205, 90, 91, 59, 141, 24; 385/24, 11, 26; 370/276, 465, 478, 494

(56) References Cited

U.S. PATENT DOCUMENTS

| | | | | |
|---|---|---|---|---|
| 5,060,225 A | * | 10/1991 | Godfrey | ...................... 398/79 |
| 5,793,508 A | | 8/1998 | Meli | |
| 5,798,855 A | | 8/1998 | Alexander et al. | |
| 6,025,944 A | | 2/2000 | Mendez et al. | |
| 6,038,357 A | | 3/2000 | Pan | |
| 6,078,418 A | * | 6/2000 | Hansen et al. | ............... 398/147 |
| 6,385,356 B1 | * | 5/2002 | Jopson et al. | .................. 385/11 |
| 6,427,043 B1 | * | 7/2002 | Naito | .......................... 385/123 |
| 6,631,018 B1 | * | 10/2003 | Milton et al. | .................. 398/59 |
| 2001/0030787 A1 | * | 10/2001 | Tajima | ........................ 359/128 |
| 2002/0080436 A1 | * | 6/2002 | Hait | ........................... 359/109 |

OTHER PUBLICATIONS

Lo, Y.V., "On a Statistical Space–Time Modulation Theory," *Proc. IEEE P.R. Conf. On Communications*, Computers and Signal Processing, pp. 584–589, Victoria, B.C., Canada, Jun. 1989.

(Continued)

*Primary Examiner*—Hanh Phan
*Assistant Examiner*—David C Payne
(74) *Attorney, Agent, or Firm*—Trojan Law Office

(57) ABSTRACT

A system and method for increasing channel capacity in fiber-optical communication networks utilizing space and time modulation. The system utilizes a three-dimensional spatial field of time division multiplexing, polarization modulation, and wavelength division multiplexing to increase channel capacity. A plurality of transmitter data processors receive a plurality of channel inputs for transmission over the optical network. The transmitter data processor produces time division multiplexing of a plurality of data channel inputs into a plurality of temporal and spatial data streams. A plurality of optical sources receive and directly modulated by the plurality of temporal data streams which are then polarization modulated before being delivered to a wavelength division multiplexer for transmission over an fiber-optics cable.

38 Claims, 15 Drawing Sheets

OTHER PUBLICATIONS

Lo, Y.V., "Space–Time Processing for Optical Communication Systems", *Proc. 15th Sym. Comm.*, pp. 176–179, Kingston, Ontario, Canada, Jun. 1990.

S. Benedetto, et al., Multilevel Polarization Modulation Using a Specifically Designed LiNbO.sub.3 Device, IEEE Photonic Tech. Lett., Aug. 1994, pp. 949–951.

S. Benedetto and Poggiolini, "Theory of Polarization Shift Keying Modulations," IEEE Trans. on Comm., vol. 40, pp. 708–721, Apr. 1992.

S. Benedetto and Poggiolini, "Multilevel Polarization Shift Keying: Optimum Receiver Structure and Performance Evaluation" IEEE Trans. on Comm., Mar. 1994.

S. Betti, G.D. Marchis, and E. Iannone, "Polarization Modulated Direct Detection Optical Transmission Systems," J. of Lightwave Technol., vol 10, pp. 1985–1997, Dec. 1992.

S. Benedetto, et al., "LiNbO3 modulator for binary and multilevel polarization modulation," OFC '94 Tech. Dig., p.p. 286–287. (1994).

L.A. Campos, "16–Gbit/s time– and polarization–division–multiplexed system using a novel compensation technique," OFC '94 Tech. Dig., pp. 14–15. (1994).

P.M. Hill, et al., "Optical Polarization Division Multiplexing at 4 Gb/s," IEEE Photonics Tech. Lett., May 1992, pp. 500–502.

J.J. Pan, et al., "Endless Fiber–Optic Polarization Controller with Low Driving Voltage and 30–dB Extinction Ratio," OFC '94 Technical Digest, pp. 125–126, 1994.

S. Benedetto, "Polarization Recovery in Optical Polarization Shift–Keying Systems," IEEE Trans. On Comm., vol. 45, No. 10, Oct. 1997.

* cited by examiner

SYSTEM AND METHOD FOR INCREASING CHANNEL CAPACITY OF FIBER-OPTIC COMMUNICATION NETWORKS

This application is a continuation of PCT/US01/21062 filed Jun. 29, 2001 and U.S. Provisional Application Ser. No. 60/217,136 filed Jul. 10, 2000 are hereby claimed.

BACKGROUND OF THE INVENTION

1. Field of the Invention

This invention relates to optical communication networks and more particularly relates to a system and method for increasing the channel capacity and total system throughput of a fiber-optic communication network utilizing three-dimensional spatial field.

2. Background Information

As data communication systems and networks consume more and more bandwidth, fiber-optics has emerged as a leading technology for metropolitan and long-haul data transmissions. Access techniques, adapted from electronics communication, such as Code Division Multiplexing (CDM), Frequency Division Multiplexing (FDM), and Time Division Multiplexing (TDM) have been used in fiber-optic systems and networks. For example, Wavelength Division Multiplexing (WDM) is essentially FDM in the optical domain. To further conserve the bandwidth of an optical network, a so-called Dense WDM (DWDM) standard has been proposed with the channel separation set at 0.8 nm in wavelength, or 100 GHz in frequency.

One area unique to optical communications has provided another dimension for capacity enhancement. This is the polarization of an optical signal. Lithium Niobate (LiNbO) phase modulators and polarization controllers, and Pockels cells have been used to implement polarization shift keying (POLSK). Other investigations have considered polarization of signals in different wavelength channels. One example is in U.S. Pat. No. 6,038,357 of Pan issued Mar. 14, 2000 that discloses a fiber-optic PDM/WDM system comprising a plurality of sets of laser sources maintained at fixed polarization states. Each state represents a different channel. The design disclosed in that patent accomplishes an increase in the number of channels at the expense of using multiple sets of laser sources. Another U.S. Pat. No. 6,025,944 of Mendez et al issued Feb. 15, 2000 discloses a clever but complex coding scheme to perform hybrid mixing of Wave Division Multiplexing (WDM) and Code Division Multiple Access (CDMA). The tradeoff in using a complex switching and coding method to improve channel capacity is unclear.

It is one object of the present invention to provide a system and method for increasing channel capacity and throughput of an optical communications network by a combination of Polarization Modulation (PM), Wavelength Division Multiplexing (WDM), and Time Division Multiplexing (TDM). Time division multiplexing increases the number of available channels while polarization modulation increases the throughput.

It is another object of the present invention to provide a system and method for increasing channel capacity and throughput by applying space-time modulation to guided optical communications.

Yet another object of the present invention is to provide a system and method of increasing channel capacity and throughput by direct modulation of optical sources.

Still another object of the present invention is to provide a system and method for increasing transmission distance by including signal amplification with optical amplifiers inserted in the optical transmission fiber.

Yet another object of the present invention is to provide a system and method for increasing channel capacity and throughput in which an optical wavelength cross-connect is inserted in an optical fiber transmission line to reuse wavelengths.

Still another object of the present invention for increasing channel capacity of an optical network in which temporal data streams from time division multiplexers are modulated on optical sources.

Still another object of the present invention is for increasing throughput of an optical network in which spatial data streams from time division multiplexers are modulated on outputs of optical sources by varying the polarization states of the optical field.

Yet another object of the present invention is to provide a system and method for increasing channel capacity and throughput which can be applied to conventional wavelength division multiplexing ring network.

Yet another object of the present invention is to provide a system and method for increasing channel capacity and throughput which can be applied to a conventional wavelength division multiplexing fiber-optic star coupled network of a plurality of wavelengths.

Still another object of the present invention is to provide a system and method for increasing channel capacity and throughput by application to a conventional wavelength division multiplexing fiber-optic data bus network operating with multiple wavelengths comprised of multiple Network Interface Units (NUI) communicating over an optical fiber network.

BRIEF DESCRIPTION OF THE INVENTION

The purpose of the present invention is to apply space-time modulation to increase channel capacity of optical communication networks by utilizing a three-dimensional spatial field.

The basis of the present invention disclosed herein is a direct application of the space-time modulation to guided optical communications, where a single mode fiber can be used for long-haul data transmission. The space-time modulation provides capacity expansion by utilizing the three-dimensional spatial field. The spatial modulation can be compressed in the form of spatial carriers, $E_x$, $E_y$. The relationship of the x y components and its propagation direction z forms the basis functions for data transmission.

When the spatial dimension is not being used as in the case of a linearly polarized signal, all data loading is limited in time along the propagation axis. Assuming a space-time separable channel, the temporal information carrier on the propagation axis becomes independent of the transverse plane where the relative phase position (state of polarization) can be modulated. By utilizing both spatial and temporal modulation, total system throughput can be substantially increased.

In the present invention, a combination of Polarization Modulation (PM), Wavelength Division Multiplexing (WDM), and Time Division Multiplexing (TDM) technology is utilized. The hardware implementation of the three-dimensional spatial field processing is simple and straight forward. Due to the special design disclosed herein, the polarization, wavelength, and time channels enjoy total independent operation from each other. The resulting degrees of freedom add flexibility in supporting multiple users in a large variety of optical network configurations and services. Furthermore, the independent operations imply more data channels can be added as the fiber-optic network grows under market demand. Thus, once the optical fibers are laid; only incremental cost is required to cover a fixed size network. The overall channel capacity in terms of number of channels as well as data rate throughput is simply the product of the contribution from individual modulation and multiplex technology. This aggregate throughput can be orders of magnitude higher than each multiplex technology itself.

In the system and method of the present invention using the combination of PM, WDM, and TDM technology, the TDM increases the number of available channels while the PM increases the throughput. In accordance with the present invention, the channel capacity of conventional wavelength division multiplexing network system can be significantly increased depending on the levels of polarization modulation. For a typical WDM system using N signal sources transmitting to N receivers at N different wavelengths, only N communication channels are available for data transmission. The present invention effectively increases N by a factor equal to the time division multiplexing channels. This is achieved without requiring additional sets of optical or laser sources.

In one embodiment of the present invention, the system has direct modulation of optical sources. The system has a plurality of optical network sources each driven by a temporal path consisting of time division data from a transmitter data processor. The transmitter data processor multiplexes a plurality of input channels of data into a time division multiplex data stream of temporal and spatial data. Spatial data output of the transmitter data processor is directed to a polarization modulator while temporal data is sent to the optical source for direct modulation. Each optical source input is connected to a transmitter data processor and its output to a polarization modulator. The polarization modulator produces optical symbols corresponding to various polarization states.

Each polarization modulator output is sent to a Wavelength Division Multiplexer (WDM) before being transmitted through an optical fiber. The optical fiber is connected to a wavelength division demultiplexer. Each wavelength output of the demultiplexer is connected to a polarization demodulator followed by direct photo-detection and then a receiver data processing circuit. The receiver data processor demultiplexes the received time division multiplex data from the received spatial and temporal data channels into a plurality of output data channels.

A variation of the invention includes signal amplification with optical amplifiers inserted in the single optical transmission fiber. The use of signal amplification in the optical fiber extend the transmission distance of the optical fiber for long haul applications.

Another optional but preferred feature of the invention is the use of an optical wavelength cross-connect inserted in the optical fiber transmission line to reuse these wavelengths a plurality of times for connecting various transmitters and receivers rather than having wavelength routing without reuse. In this embodiment, a first user can use a particular wavelength to establish a link with a second user while simultaneously a subsequent user can reuse the same wavelength and channel to communicate with yet another user. Compared to a typical wavelength division multiplexed fiber-optic network system operated with a pre-determined number of wavelengths without reuse, the total number of channels with this new design is substantially increased.

Another object of the present invention is a system in which the optical source or sources are not directly modulated. Rather, the optical output signal from the source or sources is spatially modulated in polarization and temporally modulated in amplitude, phase, and/or frequency by a polarization modulator performing the function of space-time modulation. The polarization modulator is driven by a transmitter data processor. In most applications, indirect amplitude or indirect phase modulation is desirable to preserve the stability of the optical source. The output of each polarization modulator is sent to a wavelength division multiplexer before being transmitted over an optical fiber. The optical fiber terminates at a WDM demultiplexer. Each wavelength is then demodulated by a polarization demodulator followed by coherent detection and finally processed in a received data processor. The coherent optical detection can be implemented with a local optical source using homodyne or heterodyne demodulation techniques.

The method and system of the present invention can also be applied to a conventional wavelength division multiplexing ring network. In this embodiment each source is directly modulated by a transmitter data processor. The output temporal path of each transmitter data processor is directed to an optical source while spatial data is sent to a polarization modulator that produces optical symbols corresponding to various polarization states as before.

The output of each polarization modulator is then multiplexed by a wavelength division multiplexer before transmission over an optical fiber to add/drop nodes in the ring network. Each add/drop node of multiple add/drop nodes around the ring operates at a specific wavelength providing multiple time division multiplexing channels. The specific wavelength output of the add/drop node of the ring network is then connected to a polarization demodulator. This demodulation process is followed by feeding the signals to direct photo-detection and receiver data processing. The receiver data processor demultiplexes the received TDM data from the received spatial and temporal data channels into a plurality of output data channels.

Each add/drop node of the multiple nodes in the ring network includes a receiver/transmitter pair. The receiver is capable of polarization demodulation, direct photo-detection and received data processing of multiple time multiplexed output channels. Transmitter reverses the operation by time multiplexing of data channels, direct modulation onto the optical source followed by polarization modulation.

A wavelength division demultiplexer extracts a signal at one wavelength and transmits the signal back at the same wavelength. The same operation is repeated in the next or sequential add/drop nodes of the optical fiber until it reaches the end of the ring. Access into and egress out of the ring network is under computer control. If any receiver/transmitter processor wishes to transmit signals, its transmitter sends data through the time division multiplexed channel. These optical signals pass through the WDM multiplexers and circulate around the ring. Hence, in this embodiment, the number of network users at each add/drop nodes increases by a substantial factor.

Another application of the system is in a conventional WDM fiber-optic star network of a plurality of wavelengths that consist of a star coupler connected to a plurality of nodes. Each node transmits at one of the optical wavelengths equal to the number of nodes to the star coupler which distributes the optical signals. One of the plurality of nodes is used as a central office for access and egress control of the network. The star coupler broadcasts any optical signals from one node to all the other nodes in the network. Each node also each receives and demultiplexes broadcasts signals from star coupler to determine whether it has messages sent from other nodes.

Another embodiment of the present invention is adapted to a star network. Each star network has now increased its throughput by M times, while the total number of channels has gone up to N×L times. Nodes are connected by a star coupler. Network users in the present invention at each node are allocated specific TDM channels in the transmitter/receiver data processor. The temporal data path is directed to the optical source while the spatial data is sent to the polarization modulator. The modulator produces symbols corresponding to various polarization states. The output of each polarization modulator at the particular wavelength is sent to the star coupler for distribution of the wavelength multiplexed signal to all other nodes. On the return path, the WDM signal is extracted from a WDM demultiplexer and polarization demodulated. This is followed by a photo-detector and transmitter/receiver data processor. The processor demultiplexes the received TDM data and the received spatial data.

The system disclosed herein can also be applied to conventional WDM fiber-optical data bus network operating with multiple wavelengths comprised of multiple Network Interface Units (NIU) communicating over an optical fiber. In the conventional WDM fiber-optic data bus network, each network interface unit, by which a user communicates over the network, has multiple fixed wavelength optical transmitters and multiple receivers. Due to hardware cost of installing multiple pairs of transmitter/receivers for network interface unit, each NIU generally only contains a few pairs of transmitter/receivers such that multiple hops are required to relay messages from one user to another within the network. Because of this reason, network loading becomes a problem during high network utilization period. Furthermore, each NIU can only be shared by a small limited number of users due to few pairs of transmitter/receivers are available.

In another optional embodiment of the present invention, each fixed wavelength transmitter at the NIU is driven by a transmitter data processor. The temporal data path from the transmitter data processor is directed to the optical source while the spatial data is sent to a polarization modulator that produces symbols corresponding to various polarization states. The output of each polarization modulator at specific wavelengths circulates in the data bus. Reverse operations are carried out by a receiver. An optical signal at each wavelength is connected to a polarization demodulator. This is followed by direct photo-detection and receiver data processing. The processor demultiplexes the received TDM data and its received spatial data. With a plurality of additional TDM channels, the same data processor can now support a number of users equal to the number of additional channels without installing more transmitter/receiver pairs.

In the present invention when increasing channel capacity and throughput of an optical communication network, a combination of polarization modulation, wavelength division multiplexing, and time division multiplexing technology is utilized. Time division multiplexing increases the number of available channels while polarization modulation increases the throughput. A systems theory related to the present invention is described by Victor Lo in "On A Statistical Space-Time Modulation Theory," Proc. IEEE P.R. Conference on Communications, Computers and Signal Processing, pp. 584–589, Victoria, B.C., Canada, June, 1989. Hardware implementation of a polarization modulator has been described by Sergio Benedetto in "Multilevel Polarization Modulation Using A Specifically Designed LiNbO,", IEEE Photonic Tech. Lett, August 1994, pp. 949–951. Details of a polarization demodulator suitable for the invention are discussed in "Multilevel Polarization Shift Keying: Optimum Receiver Structure and Performance Evaluation," IEEE Trans. on Comm., March 1994, and demodulation tracking loop in "Polarization Recovery In Optical Polarization Shift-Keying Systems" IEEE Trans. on Comm., vol. 45, no. 10, October 1997.

Due to the unique design disclosed in this application, polarization, wavelength, and time channels enjoy total independent operation from each other. The increase in the degrees of freedom from this design adds flexibility in supporting multiple users in a large variety of optical network configurations and services. Furthermore, the independent operations imply more data channels can be added as the fiber-optic network grows under market demand. Thus, once the optical fibers are laid; only incremental costs is required to cover a fixed size network. The overall channel capacity in terms of number of channels as well as data rate throughput is simply the product of contribution from individual modulation and multiplex technology. This aggregate throughput can be orders of magnitude higher than each technology itself.

The above and other objects, advantages, and novel features of the invention will be more fully understood from the following detailed description and the accompanying drawings, in which:

DETAILED DESCRIPTION OF THE INVENTION

In accordance with the invention disclosed herein, channel capacity of fiber-optical communication networks in a conventional Wavelength Division Multiplexing (WDM) network system can be significantly increased depending on the levels of polarization modulation. For a typical WDM system using a plurality of signal sources transmitting to a plurality of receivers at a plurality of different wavelengths, only the number of communication channels equal to the number of wavelength channels are available for data transmission. The present invention significantly increases the plurality of channels by a factor equal to the time division multiplex channels. This is achieved without requiring additional sets of laser sources.

Figure 1A:
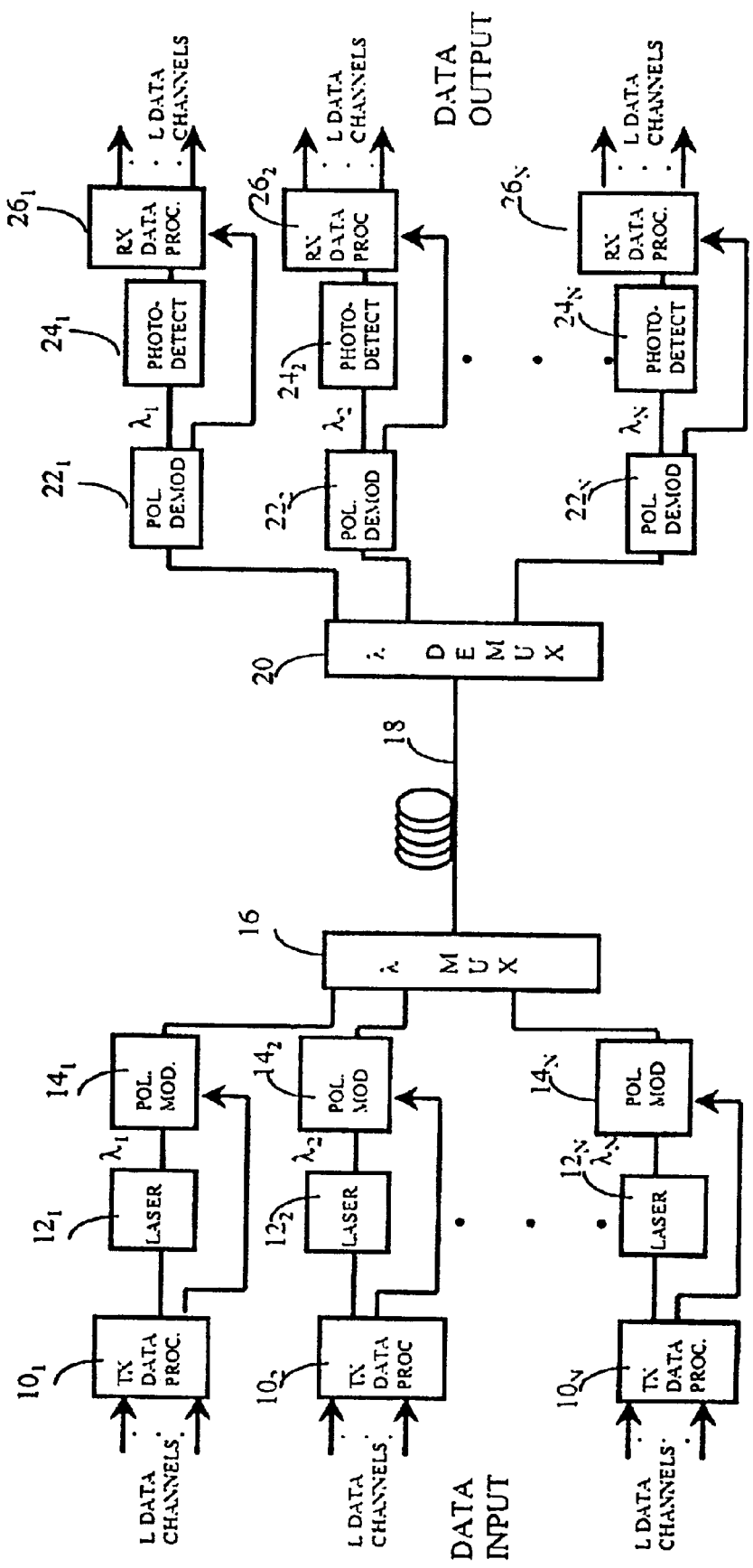
FIG. 1A is a schematic block diagram of one embodiment of a system for increasing channel capacity and throughput of optical communication networks.

One embodiment of the invention illustrated in FIG. 1A shows a system with direct data modulation on optical sources. The system of FIG. 1A has one set of network optical sources $12_1$, $12_2$ through $12_N$ where the 1-N represent N network optical sources. Each source $12_1$, $12_2$ through $12_N$ is driven by a temporal path consisting of Time Division Multiplexed (TDM) data from transmitter data processors $10_1$ through $10_N$. Each transmitter data processor $10_1$, $10_2$, $10_N$ multiplexes a plurality of input channels of data represented by L into a time division multiplexed data stream of temporal and spatial data.

The output spatial data path of transmitter data processors $10_1$, $10_2$, $10_N$ is directed to polarization modulators $14_1$, $14_2$, $14_N$ while temporal data is sent to optical sources $12_1$, $12_2$, $12_N$ for direct modulation. Each optical source $12_1$, $12_2$, $12_N$ is connected respectively to a polarization modulator $14_1$, $14_2$, $14_N$. Polarization modulators $14_1$, $14_2$, $14_N$ produce optical symbols corresponding to various polarization states. For example, with a digital modulator implementation of polarization levels represented by M, mapping to $2^M$ distinct states, polarization modulators $14_1$, $14_2$, $14_N$ generate one optical pulse at the specific state of polarization per M input pulses from the spatial path. The same optical pulse carries the temporal modulated signal originated from the optical source. The output of each polarization modulator $14_1$, $14_2$, $14_N$ is sent to a Wavelength Division Multiplexer (WDM) 16 before being transmitted over transmission optical fiber 18.

Optical fiber 18 terminates and is connected to wavelength division demultiplexer 20. Each wavelength output of demultiplexer 20 is connected to a polarization demodulator $22_1$, $22_2$, $22_N$. This is followed by direct photo-detection $24_1$, $24_2$ through $24_N$ and receiver data processing $26_1$, $26_2$, $26_N$. Receiver data processors $26_1$, $26_2$, $26_N$ demultiplex the received TDM data from the received spatial and temporal data channels into a plurality of output data channels represented by L.

Figure 4A:
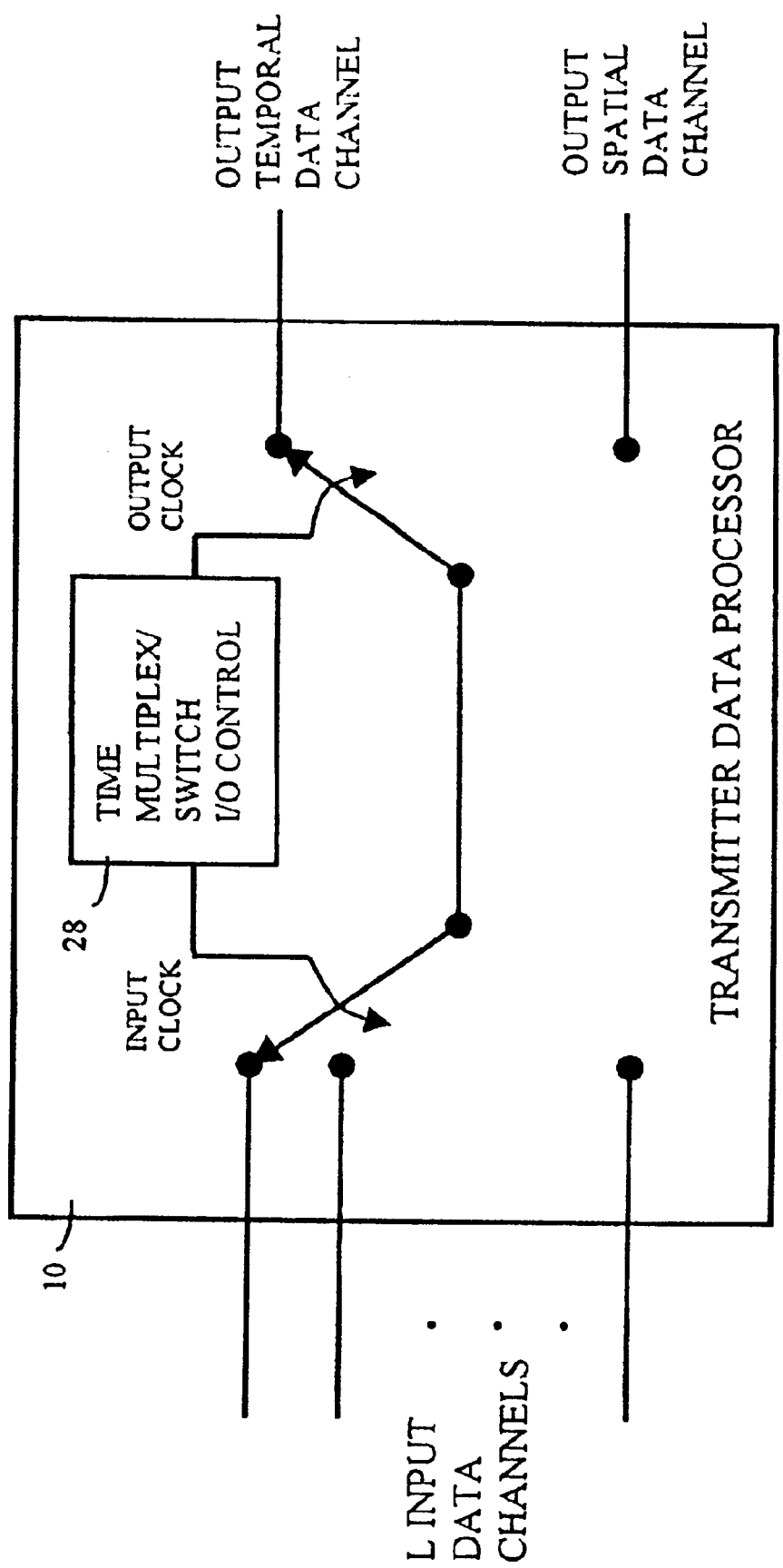
FIG. 4A is a schematic block diagram of a transmitter data processor that essentially performs the switching function of a typical time division multiplexer.
Figure 4B:
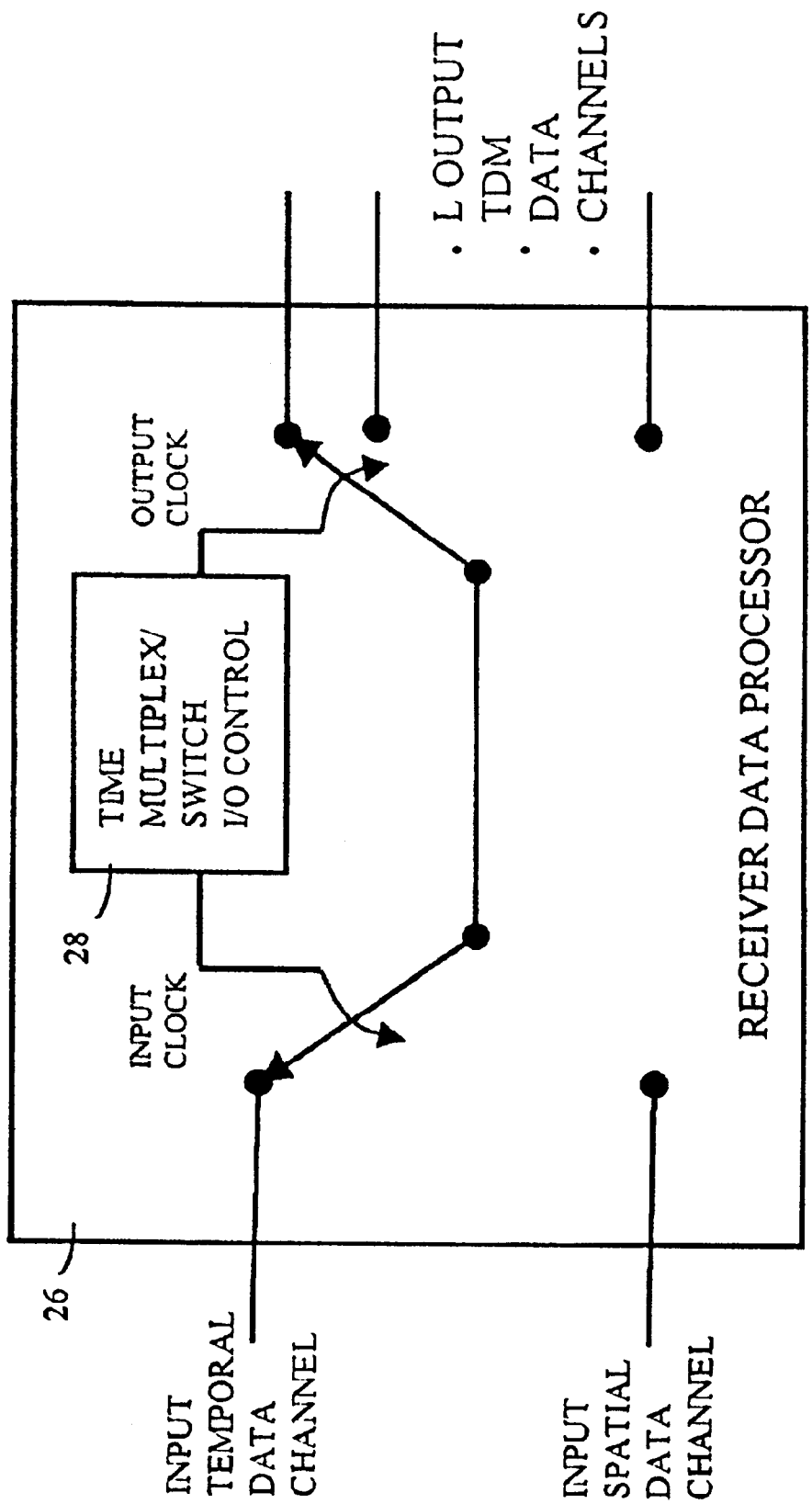
FIG. 4B is a schematic block diagram of a receiver data processor that demultiplexes input TDM data streams from the spatial and temporal channels into multiple output data channels.

A typical transmitter data processor 10 is illustrated in FIG. 4A. Transmitter data processor 10 multiplexes input channels of data represented by L into time division multiplex data stream of temporal and spatial data by input/output (I/O) control time multiplex switch 28. The output of the transmitter data processors are then sent to the source or polarization modulator as described previously. The transmitter data processor performs the function of multiplexing multiple input channels of data into a time division multiplexed data stream of temporal and spatial data. The input and output sampling is controlled by the TDM I/O switch.

Figure 5A:
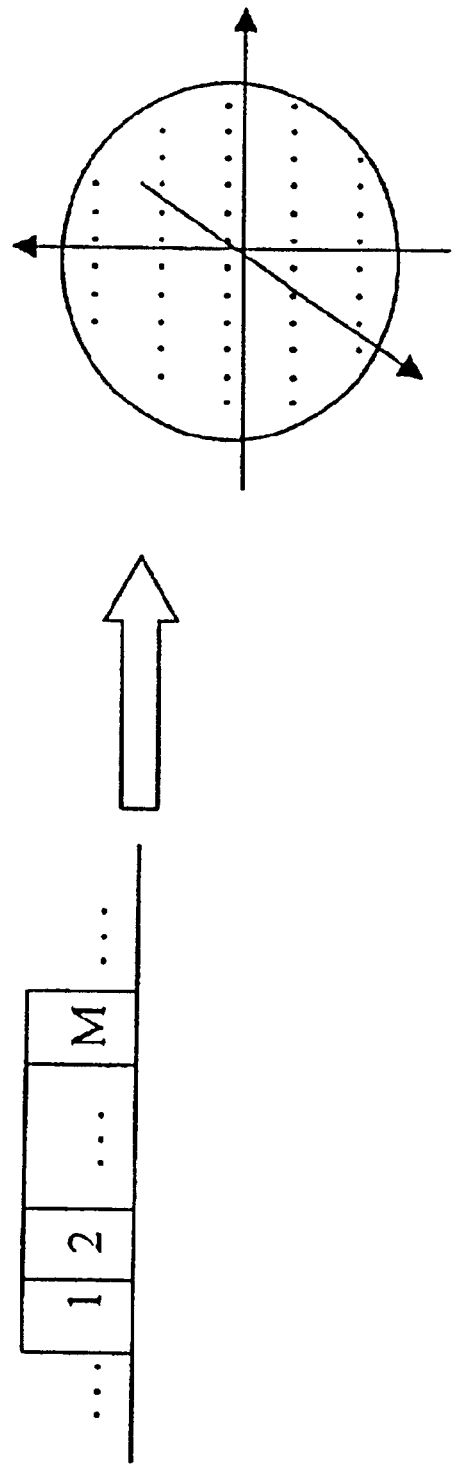
FIG. 5A is a diagram illustrating the mapping operation of a M-level polarization modulator from digital data to polarization symbols in the Poincare sphere using Stokes parameters.
Figure 5B:
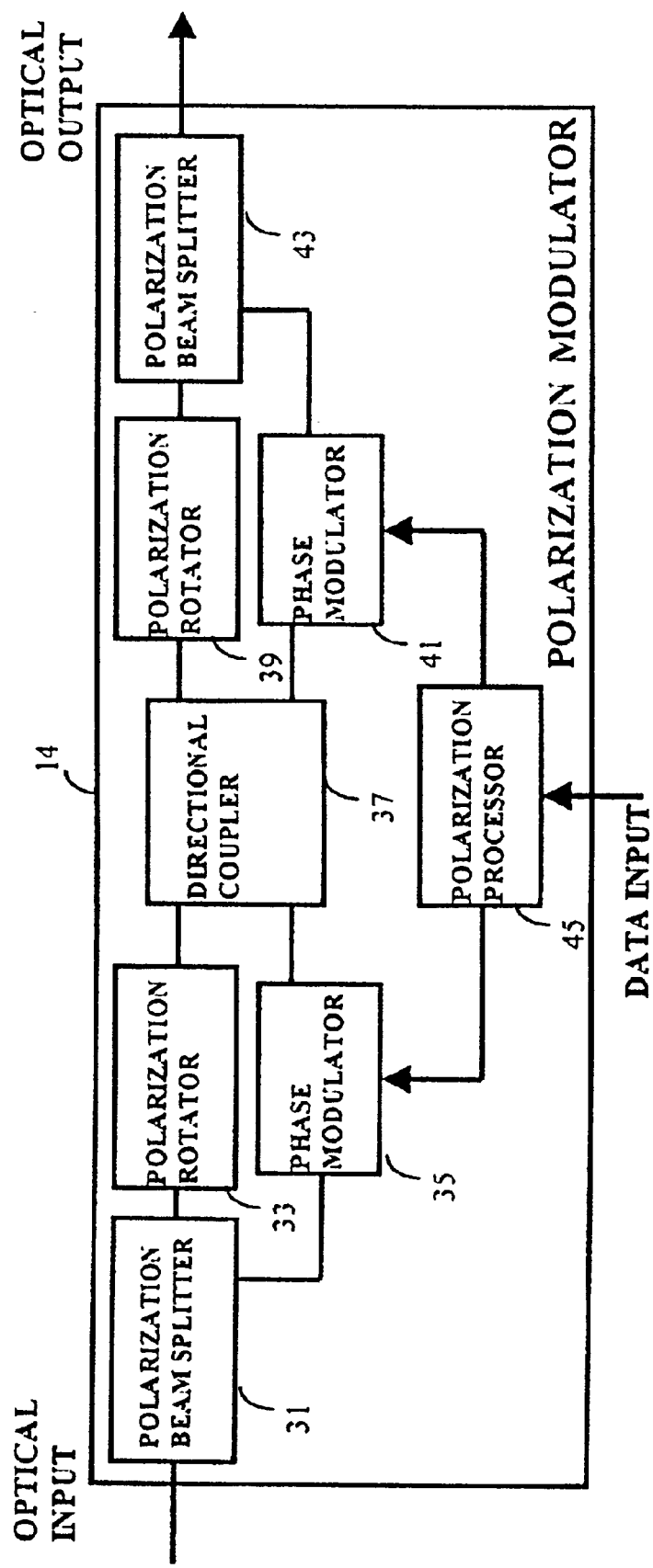
FIG. 5B is a block diagram illustrating the implementation of the mapping operation of FIG. 5A.

The mapping operation of a M-level polarization modulator from digital data to polarization symbols in a Poincare shpere using Stokes parameters is illustrated in FIG. 5A while the implementation is illustrated in FIG. 5B.

The implementation scheme of such a modulator 14 is shown in the block diagram of FIG. 5B. Polarization modulator 14 is comprised of an optical input port connected to a polarization beam splitter 31 that produces two outputs with orthogonal polarization states. One such output will be rotated by polarization rotator 33 in its polarization angle while the other is phase modulated by the input data in phase modulator 35. After they transverse through directional coupler 37, the polarization angle is rotated back by polarization rotator 39 and recombined with another phase modulated signal from the input data by phase modulator 41, polarization processor 45, and polarization beamsplitter 43.

Figure 5C:
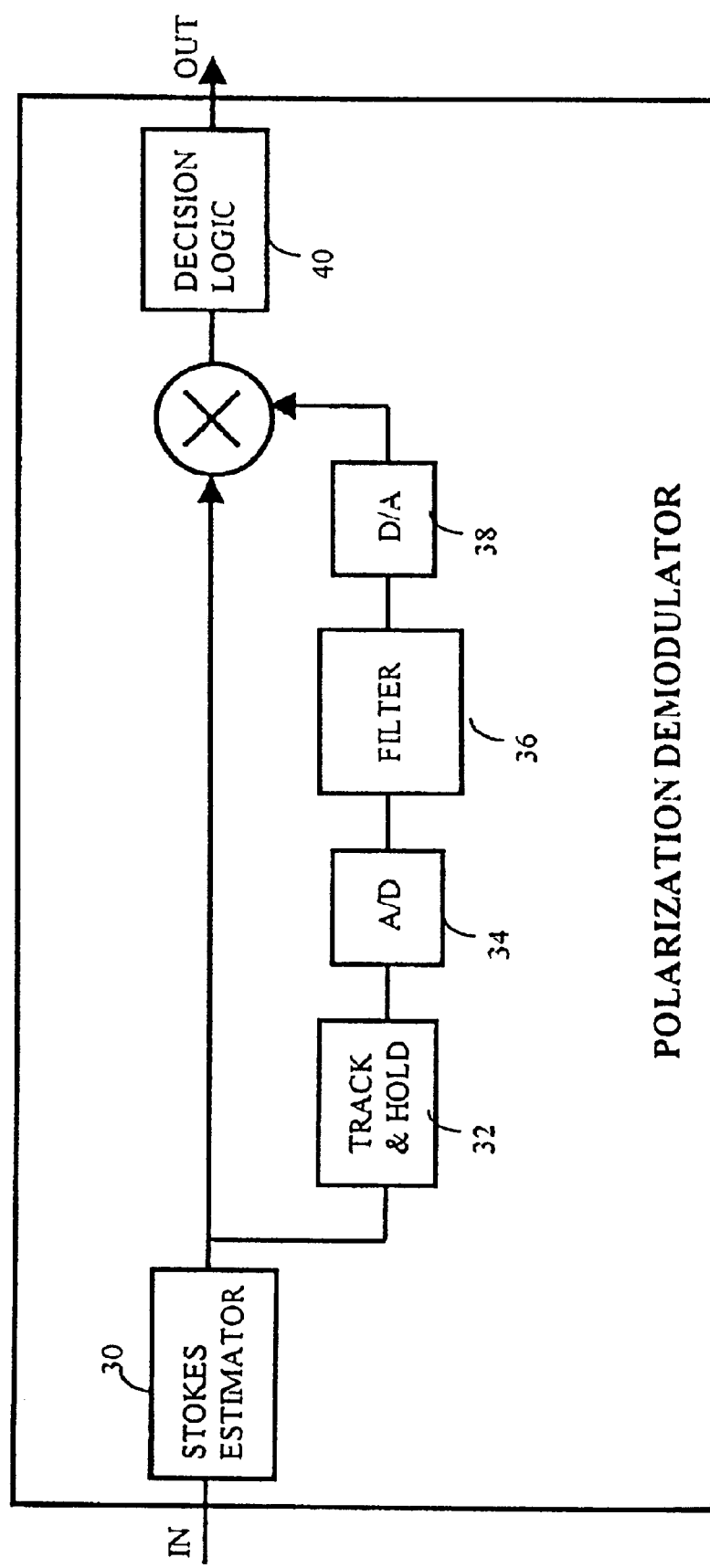
FIG. 5C is a schematic block diagram illustrating a demodulator comprised of a Stokes parameters estimator, a control loop to track changes in polarization state and a decision logic block.

Polarization demodulator 22 is illustrated in FIG. 5C. Polarization demodulator 22 is comprised of a Stokes parameter estimator 30, a control loop comprised of a track and hold circuit 32, analog to digital convertor 34, a filter 36, and digital to analog convertor 38, and decision logic block 40. The optical network system illustrated in FIG. 1A operates with a plurality of wavelengths represented by N and polarization modulation levels per wavelength represented by M. In this present invention, the throughput has been increased by M times while the total number of channels has increased up to N×L where L is the number of TDM channels. The representations by N, M, and L are purely arbitrary and can be chosen to maximize a capacity meeting specific network requirements.

Figure 1B:
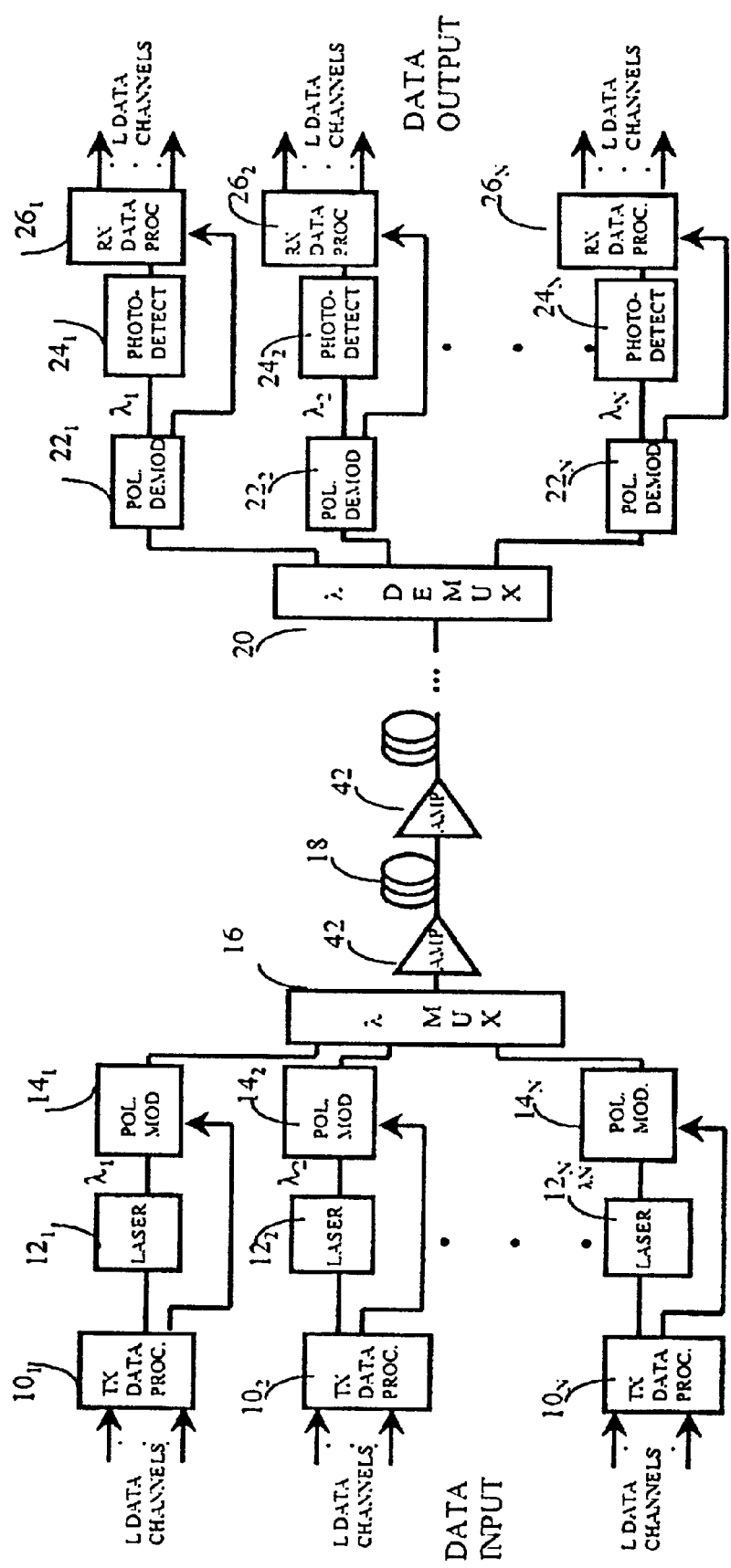
FIG. 1B is a schematic block diagram of the embodiment of one with the addition of signal amplification in the optical transmission line.

A variation of the system illustrated in FIG. 1A in which like reference numbers indicate like parts throughout is illustrated in FIG. 1B. In this embodiment rather than a simple transmission optical fiber 18 without signal amplification, optical amplifiers 42 are added to extend transmission distance of optical fiber 18 for long-haul applications.

Figure 1C:
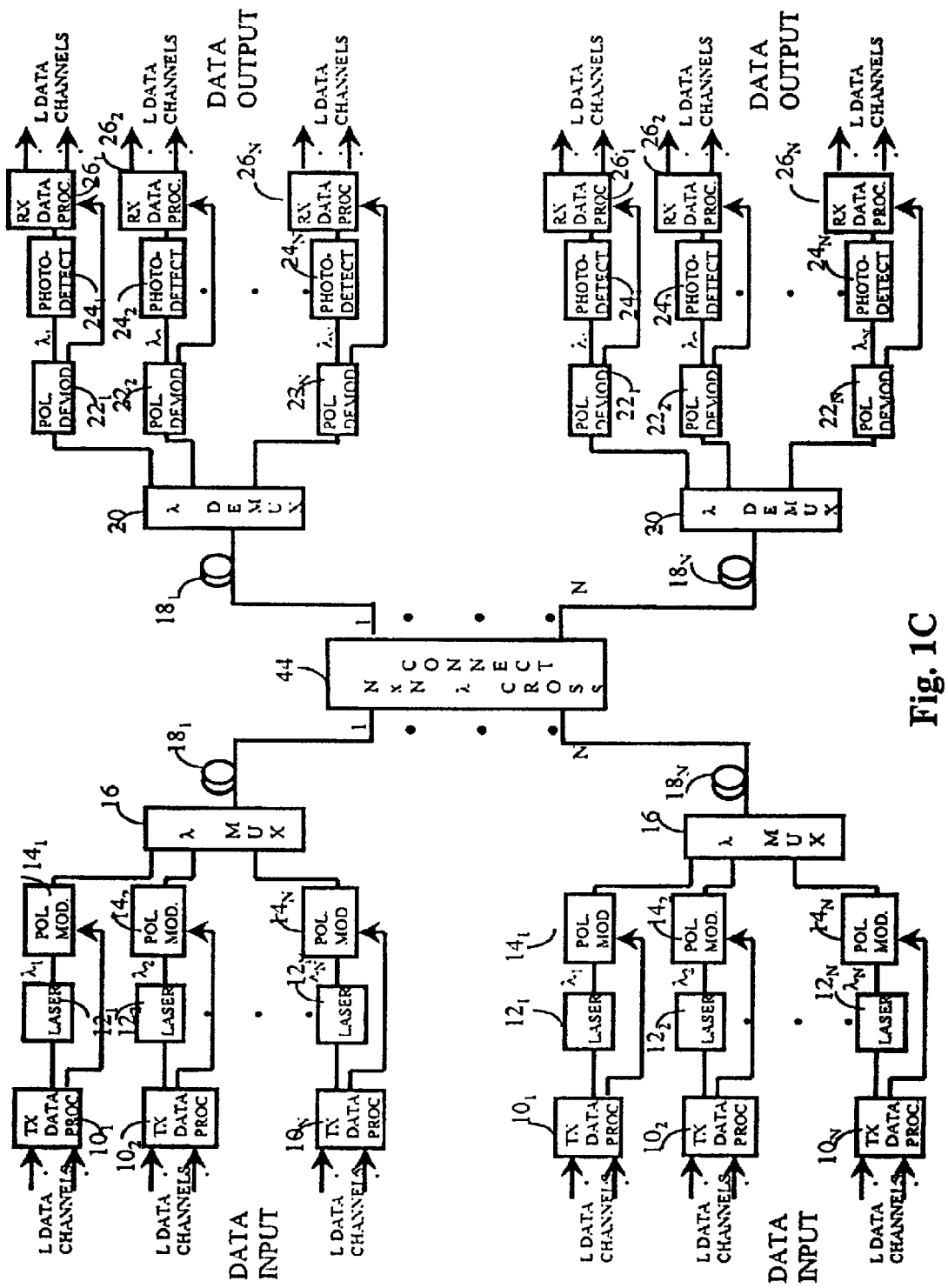
FIG. 1C is a schematic block diagram with a variation of the embodiment illustrated in FIG. 1 utilizing an optical wavelength cross-connect for reusing wavelengths.

Another variation of the system and circuit illustrated in FIG. 1A is shown in the schematic block diagram of FIG. 1C where like reference numbers indicate like parts throughout. In this case, there are multiple sets of the circuits shown in FIG. 1C to perform the multiplexing, modulation, demultiplexing and demodulation. However in this case, rather than using a single fiber-optic cable 18 as illustrated in FIG. 1A having wavelength routing without reuse, an optical wavelength cross-connect is inserted in optical fiber transmission lines $18_1$, through $18_N$ to reuse each wavelength a number of times equivalent to N for connecting various transmitters and receivers. For example, a first user I can use one of the L channels of wavelength λ1 to establish a link with a user II, while simultaneously user V can reuse the same wavelength (λ1) and channel to communicate with user VI. Compared to a typical WDM fiber-optic network system operating with multiple wavelengths without reuse represented by N, the total number of channels in this unique system is increased to (N²×L), where L is the number of TDM channels.

Figure 2A:
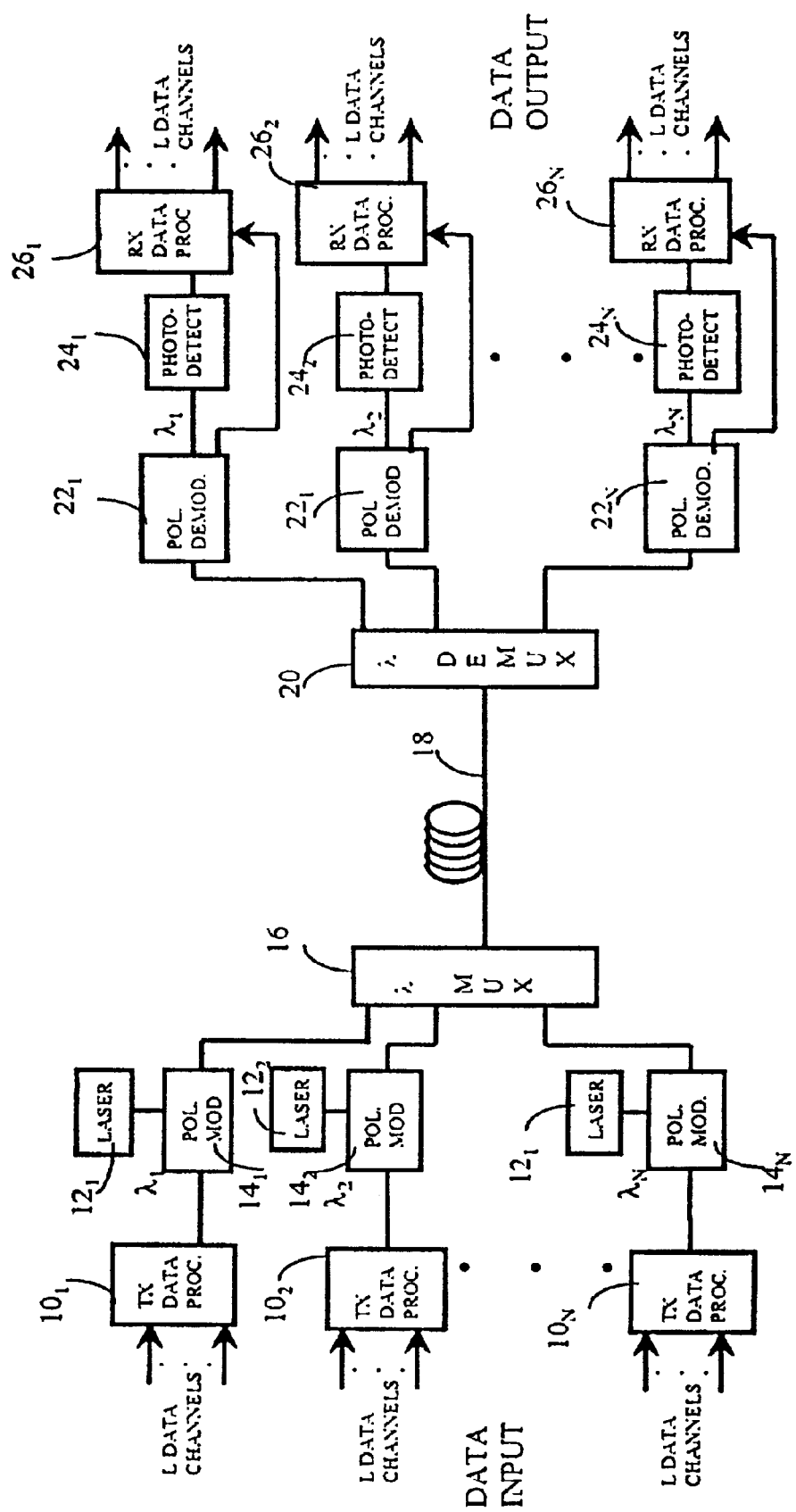
FIG. 2A is a schematic block diagram of a variation of the invention illustrated in the first embodiment of FIG. 1 in which optical sources are not directly modulated.

Another embodiment of the invention is illustrated in FIG. 2A in which like reference numbers identify like parts throughout. In this embodiment, optical sources $12_1$, $12_2$, $12_N$ are not directly modulated. In this embodiment, the optical output signal from sources $12_1$, $12_2$, $12_N$ are spatial modulated in polarization and temporally modulated in amplitude, phase, and/or frequency by space-time modulators $14_1$, $14_2$, $14_N$ driven by transmitter data processors $10_1$, $10_2$, $10_N$. In most applications, an indirect amplitude or indirect phase modulation is desirable to preserve the stability of optical sources $12_1$, $12_2$, $12_N$. Polarization modulators $14_1$, $14_2$, $14_N$ may be implemented by Electro-Optical Modulators (EOM) or Electro-Absorptive Modulators (EAM). The output of each modulator $14_1$, $14_2$, $14_N$ is sent to Wavelength Division Multiplexer (WDM) 16 before being transmitted by optical fiber 18.

Optical fiber 18 terminates and is connected to wavelength division demultiplexer (WDM) 20. Each wavelength output of wavelength division demultiplexer is connected to a polarization demodulator $22_1$, $22_2$, $22_N$. This is followed by coherent optical demodulation in photo-detectors $24_1$, $24_2$, $24_N$ and receiver data processors $26_1$, $26_2$, $26_N$. Photo-detectors $24_1$, $24_2$ through $24_N$ that provide the coherent optical demodulation can be implemented by a local optical source using homodyne or heterodyne demodulation techniques.

Figure 2B:
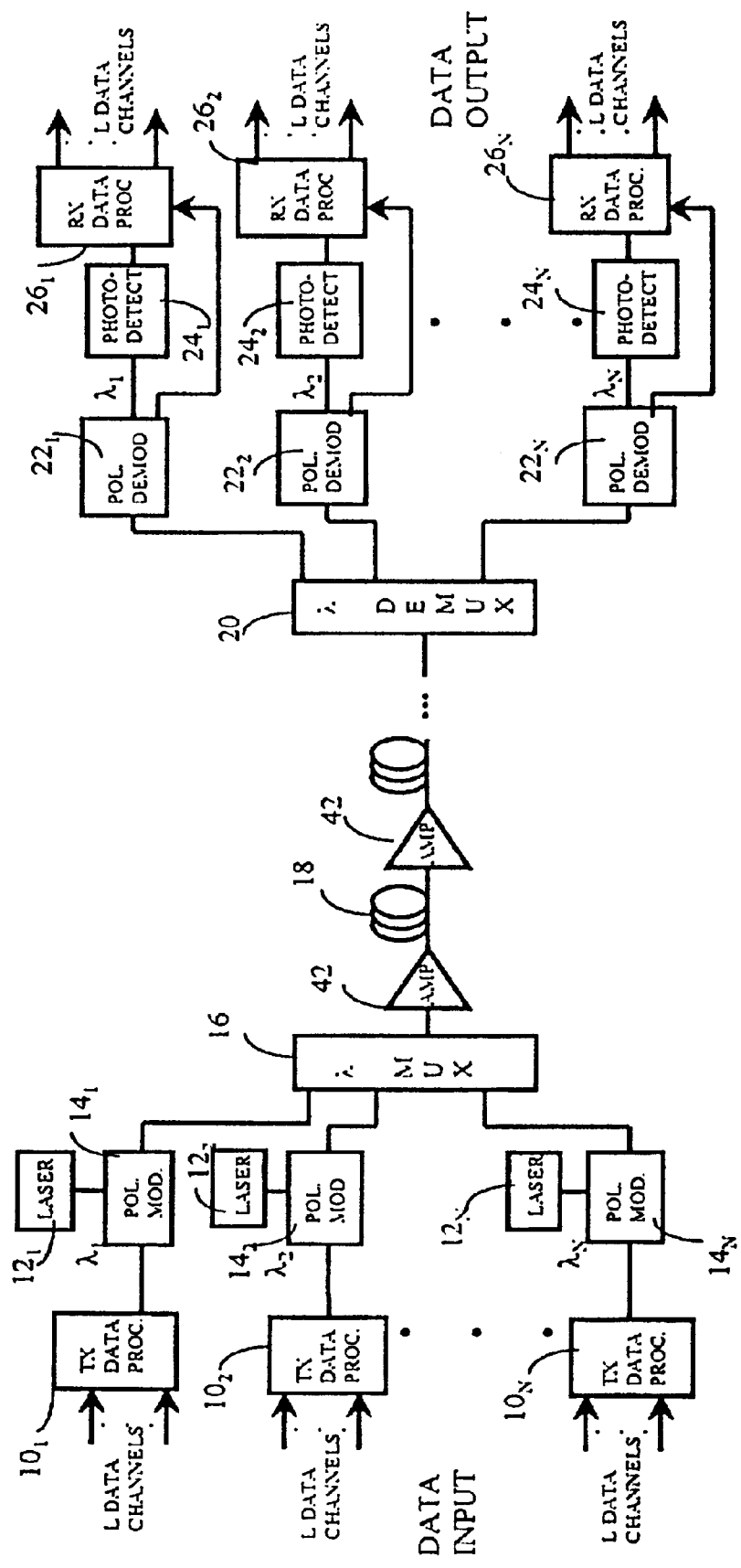
FIG. 2B is a variation of the system illustrating in FIG. 2A in which signal amplification is inserted in the optical transmission line.

A variation of this system of FIG. 2A is illustrated in FIG. 2B in which like reference numbers indicate like parts throughout. In this embodiment, rather than a simple transmission optical fiber 18 without signal amplification, optical amplifiers 42 are added to extend transmission distance of the fiber for long-haul applications.

Figure 2C:
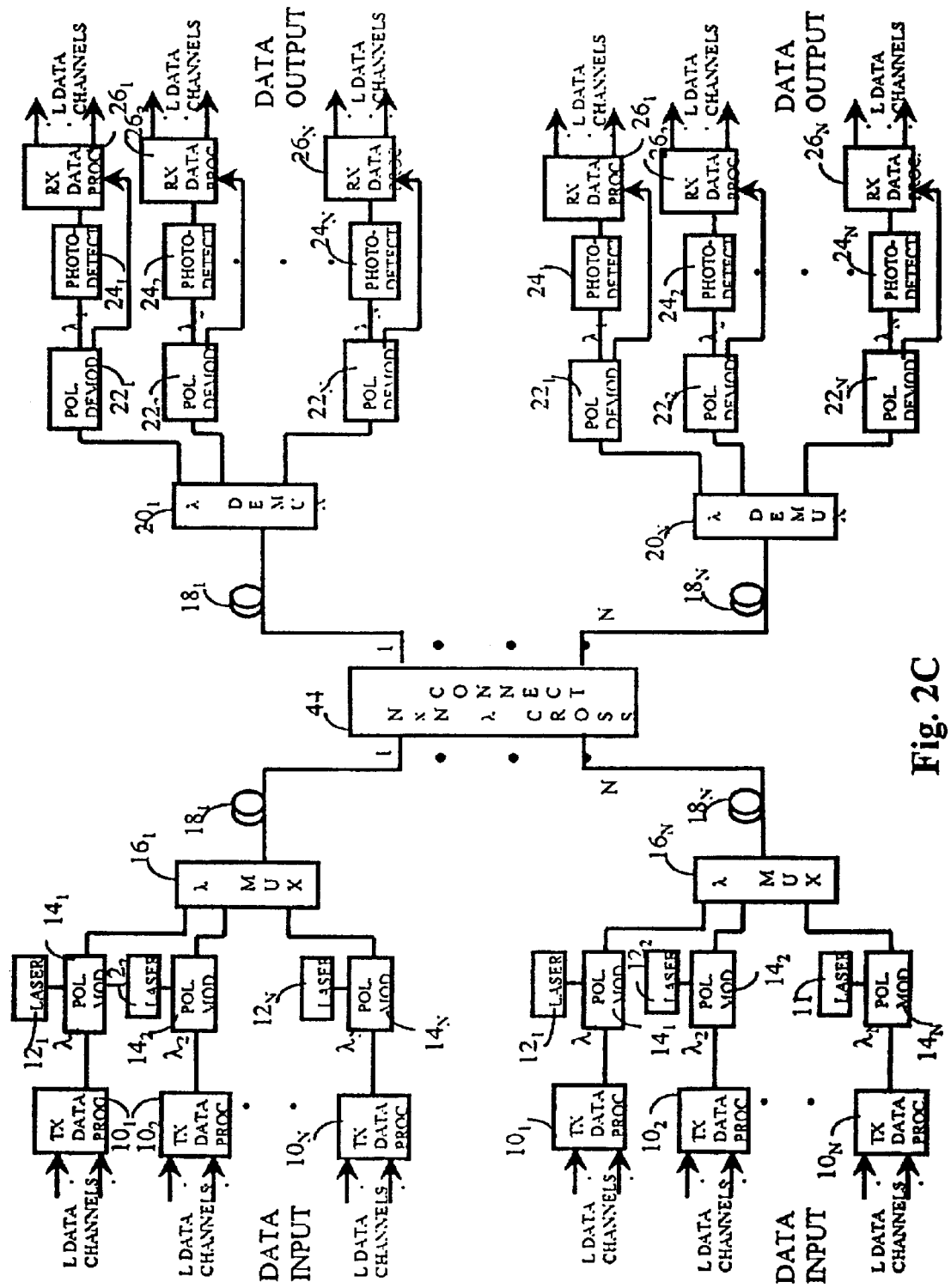
FIG. 2C is another variation of the system of FIG. 2A including an optical wavelength cross-connect to reuse wavelengths.

A variation of the system of FIG. 2A is illustrated in FIG. 2C in which like reference numbers indicate like parts throughout. The system illustrated in FIG. 2C comprises multiple sets of data processors and subsequent circuits of which can be represented by 1 through N. In this variation rather than wavelength routing without use, an optical wavelength cross-connect 44 is inserted in fiber-optic transmission lines $18_1$ through $18_N$ to reuse each wavelength multiple times represented by N for connecting various transmitters and receivers. Thus, cross-connect will be an N×N wavelength cross-connect.

For example, a first user I can use one of the L channels of wavelength λ1 to establish a link with a second user II, while simultaneously a fifth user V can reuse the same wavelength (λ1) and channel to communicate with a sixth user VI. Compared to a typical Wavelength Division Multiplexer (WDM) fiber-optic network system operating with multiple wavelengths of N without reuse, the total number of channels of this new design is increased to (N²×L), where L is the number of TDM channels.

Figure 3:
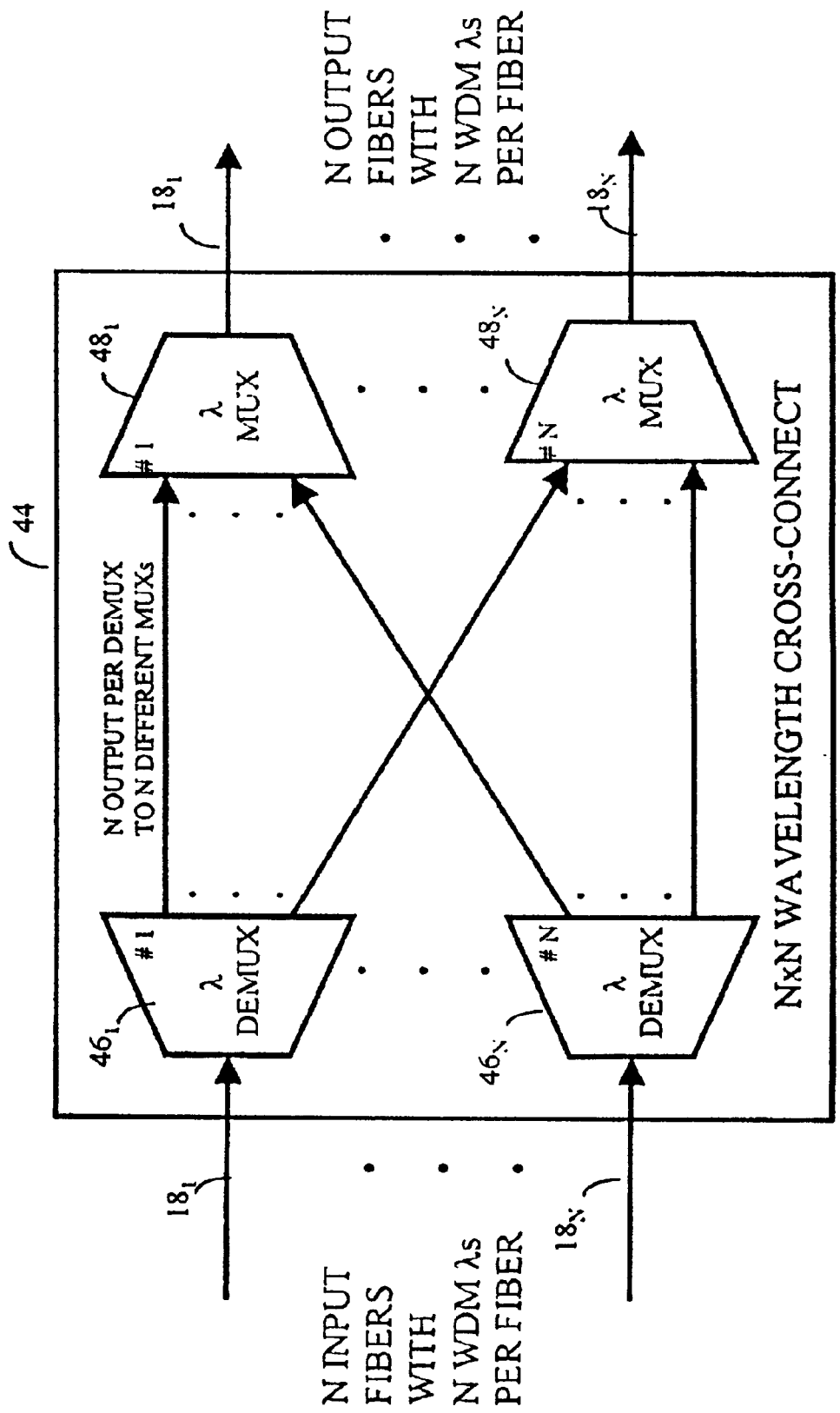
FIG. 3 is a schematic diagram illustrating a configuration of an optical wavelength cross-connect for insertion in a fiber transmission line to reuse wavelengths multiple times.

An optical wavelength cross-connect of N×N for insertion in fiber-optic transmission lines $18_1$ through $18_N$ to reuse each wavelength N times for connecting various transmitters and receivers is illustrated in FIG. 3. Each fiber-optic transmission line $18_1$ through $18_N$ feeds into wavelength demultiplexer $46_1$ through $46_N$. Each demultiplexer $46_1$ through $46_N$ provides an output to each wavelength multiplexer $48_1$, $48_1$ through $48_N$ directly and by cross connection. Each multiplexer $48_1$ through $48_N$ provides an output to fiber-optic transmission line $18_1$ through $18_N$ with multiple wavelength division multiplexed wavelengths represented by N per fiber.

Figure 6:
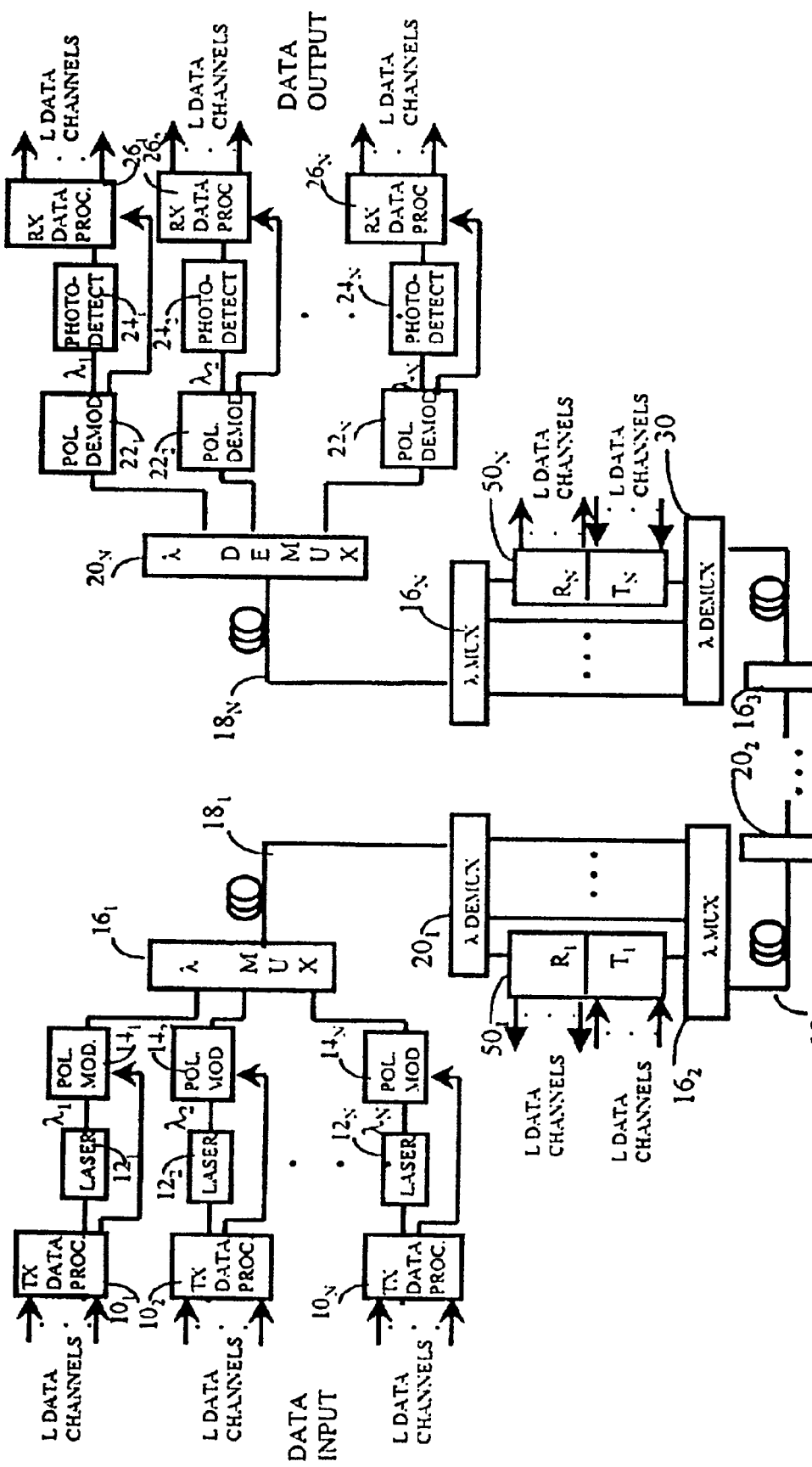
FIG. 6 is a schematic block diagram according to the invention applied to a ring network having multiple add/drop nodes.

The invention disclosed herein can also be applied to a conventional wavelength division multiplexing ring network as illustrated in FIG. 6 wherein like reference numbers again indicate like parts throughout. Similar to the embodiment of FIG. 1A, there is one set of multiple optical sources $12_1$, $12_2$, through $12_N$ which can be represented by N. Each source $12_1$, $12_2$, $12_N$ is directly modulated by transmitter data processor $10_1$, $10_2$, through $10_N$. The output temporal data path of each transmitter data processor $10_1$, $10_2$, $10_N$ is directed to each optical source $12_1$, $12_2$, $12_N$, respectively, while spatial data is sent to polarization modulators $14_1$, $14_2$, through $14_N$. Polarization modulators $14_1$, $14_2$, $14_N$ produce optical symbols corresponding to various polarization states. The output of each polarization modulator $14_1$, $14_2$, $14_N$ is sent to Wavelength Division Multiplexer (WDM) $16_1$ before being transmitted over fiber-optics transmission line 18. The wavelength output of wavelength division multiplexer $16_1$ is sent by fiber-optic transmission line 18 to wavelength division demultiplexer $20_1$ and add/drop node $50_1$ to subsequent WDM $16_2$ and multiple add/drop nodes through $50_N$ by a series of multiplexers $16_1$ through $16_N$, and demultiplexers $20_1$ through $20_N$. Each add/drop node $50_1$ through $50_N$ operates in a specific wavelength with L TDM Channels.

The specific wavelength outputs of wavelength division demultiplexers $20_1$, $20_2$, through $20_N$ (WDM) are connected to polarization demodulators $22_1$, $22_2$, through $22_N$. They are followed by photo-detectors $24_1$, $24_2$, through $24_N$ for direct photo-detection and then received by receiver data processors $26_1$, $26_2$, through $26_N$. Receiver data processors $26_1$, $26_2$, through $26_N$ demultiplex the received TDM data from the received spatial and temporal data channels into multiple output data channels L.

The combined signals in this TDM/PM/WDM ring contains multiple wavelengths represented by N, polarization levels represented by M and TDM channels per wavelength represented by L. Each add/drop node $50_1$ through $50_N$ contains a receiver transmitter pair $52_1$ through $52_N$ and $54_1$ through $54_N$ respectively. Each receiver $52_1$ through $52_N$ is capable of polarization demodulation, direct photo-detection and received data processing of multiple output data channels L. Transmitters $54_1$ through $54_N$ reverse the operation by time multiplexing multiple input data channels L, direct modulation onto optical sources followed by polarization modulation.

Wavelength division demultiplexer $20_1$ extracts a signal at one wavelength and transmits a signal back through wavelength division multiplexer $16_1$ at the same wavelength. The same operation is repeated on the next and subsequent add/drop nodes through $50_N$ on optical fibers $18_1$ through $18_N$ until it reaches the end of the ring. The access into and egress out of the ring network is under computer control. If any receiver/transmitter unit $52_1$, $52_N$, $54_1$, $54_N$ wishes to transmit signals, its transmitter sends data through the TDM channel. These optical signals pass through WDM multiplexers $16_1$ through $16_N$ and circulate around the ring. Hence, in this embodiment, the number of network users at each add/drop nodes $50_1$, $50_N$ increases a factor of L.

A conventional WDM fiber-optics star network of multiple wavelengths represented by N consists of a star coupler connected to N nodes. Each node operates with one of the optical wavelengths N and has its own laser source transmitting light at the nodes particular wavelength to the star coupler which multiplexes the optical signals at various wavelengths. One of the N nodes is used as a central office of the network. The star coupler broadcasts any optical signals from one node to all the other nodes in the network.

Each node also receives and demultiplexes broadcast signals from the star coupler to determine whether it has messages sent from other nodes.

Figure 7:
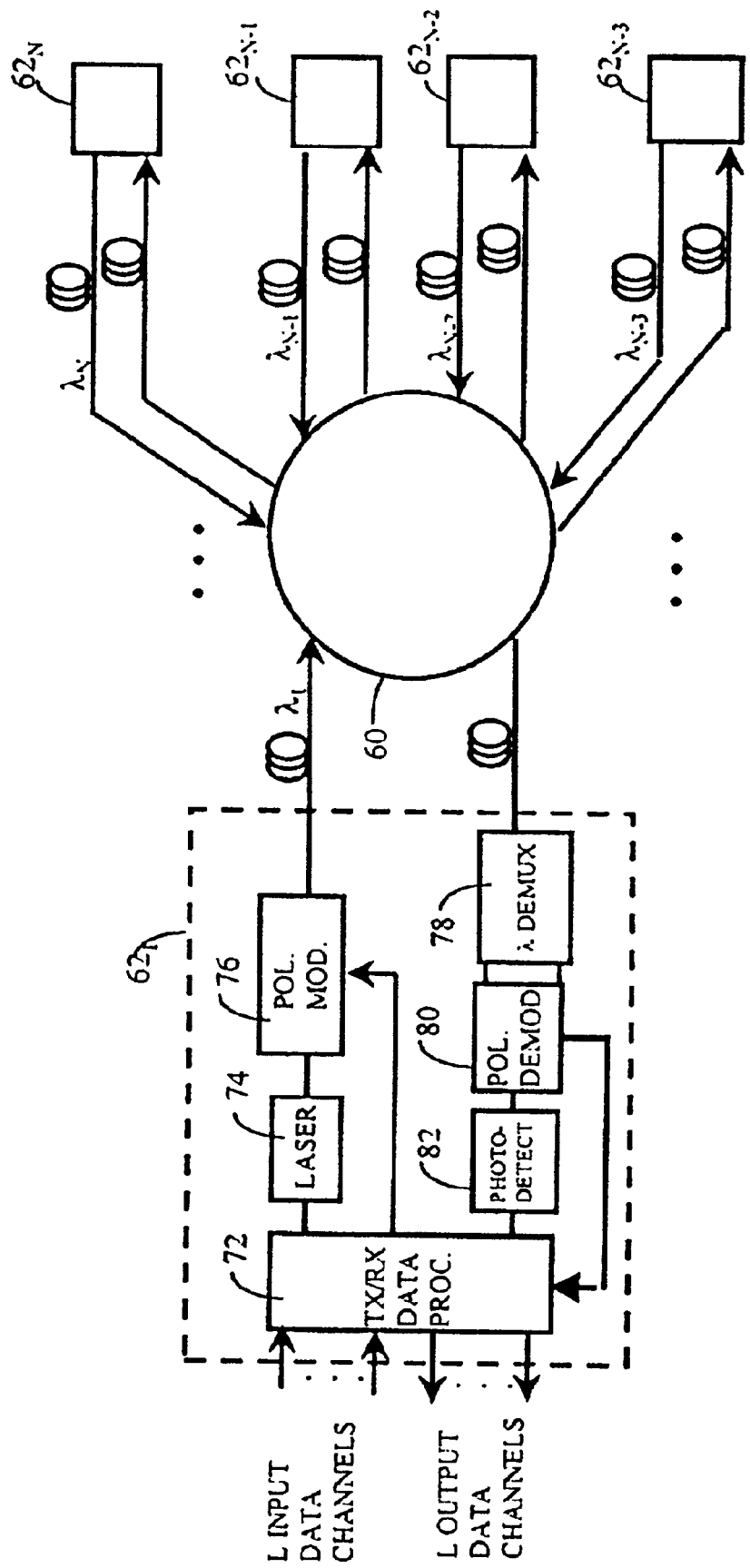
FIG. 7 is a schematic block diagram according to the invention with the system being applied to a WDM fiber-optic star network of a plurality of wavelengths.

An adaptation of the system disclosed herein is shown in still another embodiment of the present invention illustrated in FIG. 7. In this embodiment star coupler 60 is connected to multiple nodes 62$_1$ through 62$_N$. Each star network has now increased its throughput by a multiple of M times, while the total number of channels has increased to N×L times. Network users in the present invention at each node 62$_1$ through 62$_N$, and 70 are allocated specific TDM channels in the transmitter/receiver data processor 72.

The temporal data path of transmitter/receiver data processor 72 is directed to optical source 74 in each node while spatial data is sent to polarization modulator 76 in each node. Polarization modulator 76 produces optical symbols corresponding to various polarization states. The output of each polarization modulator 76 in each node at the particular wavelength is sent to star coupler 60 for distribution of the wavelength multiplexed signal to all other nodes 62$_1$ through 62$_N$. On the return path, the WDM signal is extracted from a wavelength division demultiplexer or through a wavelength tunable filter 78 and polarization demodulator 80. This is followed by detection in photodetector 82 and processed by transmitter/receiver data processor 72. Transmitter/receiver data processor 72 in each node demultiplexes received TDM data and received spatial data.

A conventional WDM fiber-optic data bus network operating with multiple wavelengths of N is comprised of multiple Network Interface Units (NIU) communicating over an optical fiber. Each network interface unit by which a user communicates over the network, has multiple fixed wavelength optical transmitters and multiple receivers. Due to the hardware cost of installing multiple pairs of transmitter/receivers per interface network unit, each NIU in general only contains a few pairs of transmitter/receivers, such that multiple hops are required to relay messages from one user to another within the network. Network loading then becomes a problem during a high network utilization period. Furthermore, each NIU can only be shared by a small limited number of users due to few pairs of transmitter/receivers are available.

Figure 8:
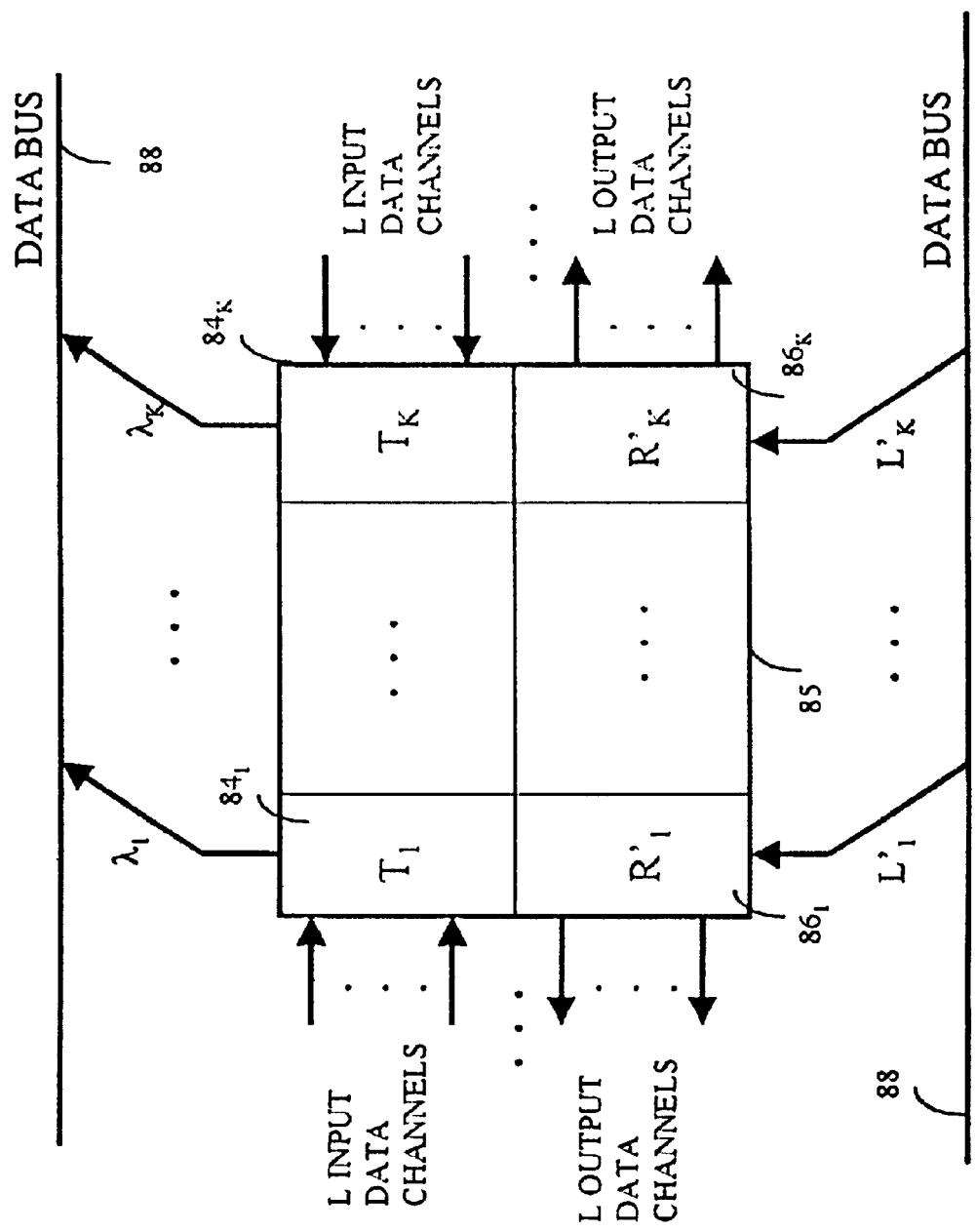
FIG. 8 is a schematic block diagram illustrating one embodiment of the present invention applied to a fixed wavelength transmitter in a WDM fiber-optic data bus network operating with multiple wavelengths that is comprised of multiple Network Interface Units (NIU).

In yet another embodiment of the present invention illustrated in FIG. 8, each fixed wavelength transmitter 84 at NIU 85 is driven by a transmitter data processor. The temporal data path from the data processor is directed to the optical source while the spatial data is sent to the polarization modulator. The modulator produces symbols corresponding to various polarization states. The output of each polarization modulator at a specific wavelength circulates in data bus 88. A reverse operation is carried out by receiver 86. This is followed by direct photo-detection and received data processing. The receiver data processor demultiplexes the received TDM data and the received spatial data with multiple additional TDM channels of L. The same data bus 88 can now support L times more users without installing more transmitter/receiver pairs.

Thus there has been disclosed a unique system for increasing the capacity of fiber-optical communication networks by a system of time division multiplexing, polarization modulation, and wavelength division multiplexing. The space-time modulation provides large capacity expansion by utilizing three-dimensional spatial field. This increase in channel capacity can be achieved by a combination of Time Division Multiplexing (TDM), Polarization Modulation (PM), and Wavelength Division Multiplexing (WDM) technology. By maintaining independence between spatial modulation, time and wavelength division multiplexing, channels derived from wavelengths in time slots can be separately assigned. The resulting degrees of freedom increase throughput and add flexibility in supporting multiple users in a large variety of optical network configuration and services.

This invention is not to be limited by the embodiment shown in the drawings and described in the description which is given by way of example and not of limitation, but only in accordance with the scope of the appended claims.

What is claimed is:

1. A system for increasing throuput and channel capacity of an optical communications network comprising;

a plurality of transmitter data processors for time division multiplexing a plurality of data channel inputs received into a plurality of temporal and spatial data streams;

a plurality of optical sources being directly modulated by said plurality of temporal data streams into a plurality of temporally modulated optical signals;

a plurality of polarization modulators for spatially modulating the polarization states of said plurality of temporally modulated optical signals with said plurality of spatial data streams received from said plurality of transmitter data processors into a plurality of space-time modulated optical signals;

a wavelength division multiplexer for wavelength division multiplexing said plurality of space-time modulated optical signals from said plurality of polarization modulators;

a fiber optic cable receiving and transmitting wavelength division multiplexed optical signals from said wavelength division multiplexer;

a wavelength division demultiplexer for demultiplexing said wavelength division multiplexed optical signals transmitted by said fiber optic cable;

a plurality of polarization demodulators for polarization demodulating a plurality of wavelength division demultiplexed optical signals received from said wavelength division demultiplexer into a plurality of polarization demodulated data streams;

a plurality of detectors for direct detection of a plurality of temporal data streams from said plurality of polarization demodulators;

a plurality of receiver data processors for demultiplexing said plurality of temporal data streams from said plurality of detectors and a plurality of spatial data streams from said plurality of polarization demodulated data streams into a plurality of data output channels;

whereby channel capacity and throughput of said optical communications network is substantially increased.

2. The system according to claim 1 in which said plurality of polarization modulators are digital modulators.

3. The system according to claim 2 in which said digital modulators produce a plurality of polarization levels to map to $2^M$ distinct states where M equals the number of polarization levels.

4. The system according to claim 1 in which said plurality of polarization demodulators are Stokes parameter estimators having a control loop for tracking polarization state changes; and a decision logic block.

5. The system according to claim 1 including one or more optical amplifiers in said fiber-optical cable to extend the transmission distance of said fiber-optics cable.

6. The system according to claim 1 including a multiple channel optical wavelength channel multiple cross-connect inserted in said fiber-optics cable for reusing each wavelength channel multiple times for connecting additional transmitters and receivers.

7. The system according to claim 1 in which said plurality of optical sources are directly modulated at the inputs by said plurality of temporal data streams.

8. The system according to claim 1 which said plurality of optical sources are indirectly temporally modulated in amplitude at the outputs of said plurality of polarization modulators by said plurality of spatial and temporal data streams from said plurality of transmitter data processors.

9. The system according to claim 8 in which said plurality of optical sources are indirectly temporally modulated in phase at the outputs of said plurality of polarization modulators by said plurality of spatial and temporal data streams from said plurality of transmitter data processors.

10. The system according to claim 8 in which said plurality of optical sources are indirectly temporally modulated in frequency at the outputs of said plurality of polarization modulators by said plurality of spatial and temporal data streams from said plurality of transmitter data processors.

11. The system according to claim 8 in which said plurality of polarization modulators are a plurality of electro-optics modulators.

12. The system according to claim 1 which said plurality of detectors for direct detection of a plurality of temporal data streams from said plurality of polarization demodulators are photo-detectors.

13. The system according to claim 8 in which said plurality of detectors are a plurality of coherent optical demodulators for temporal demodulation of optical signals received from said plurality of polarization demodulators.

14. The system according to claim 13 in which each of said plurality of coherent optical demodulators performs homodyne demodulation.

15. The system according to claim 13 in which each of said plurality of coherent optical demodulators performs heterodyne demodulation.

16. The system according to claim 8 including optical amplifiers inserted in said fiber-optical cable for extending transmission distances.

17. The system according to claim 8 including an optical wavelength cross-connect inserted in said fiber-optic transmission cable to reuse each wavelength multiple times for connecting transmitters and receivers.

18. The system according to claim 1 in which said network is a fiber-optics transmission ring network.

19. The system according to claim 18 in which;
said ring network includes a plurality of add/drop nodes each operating at a specific wavelength with L time division multiplexed channels;
said plurality of add/drop nodes being between said wavelength division multiplexer and said wavelength division demultiplexer.

20. The system according to claim 19 in which each of said plurality of add/drop nodes has a receiver/transmitter pair.

21. The system according to claim 8 in which said network is a fiber-optics transmission ring network.

22. The system according to claim 21 in which;
said ring network includes a plurality of add/drop nodes each operating at a specific wavelength with L time division multiplexed channels;
said plurality of add/drop nodes being between said wavelength division multiplexer and said wavelength division demultiplexer.

23. The system according to claim 22 in which each of said plurality of add/drop nodes has a receiver/transmitter pair.

24. The system according to claim 1 in which said optical network is a star coupled network having a plurality of nodes connected by a star coupler.

25. The system according to claim 24 in which said plurality of nodes comprise;
a transmitter/receiver data processor;
an optical source receiving temporal data from said transmitter/receiver data processor;
a polarization modulator receiving spatial data from said transmitter/receiver data processor, said polarization modulator being connected to said star coupler for distribution of wavelength multiplexed signals to all of said plurality of other nodes;
a wavelength demultiplexer for extracting a wavelength division multiplexed signal;
a polarization demodulator receiving an output from said wavelength demultiplexer;
a photo-detector receiving an output from said polarization demodulator;
a coupler for distributing a wavelength division multiplexed signal;
whereby each of said nodes distributes a signal at an optical wavelength to the star coupler and it demultiplexes wavelengths from the star coupler, demodulates the polarization and photo-detects received time division multiplexed data streams of spatial and temporal data for delivery to said transmitter/receiver data processor.

26. The system according to claim 8 in which said optical network is a star coupled network having a plurality of nodes connected by a star coupler.

27. The system according to claim 26 in which said plurality of nodes comprise;
a transmitter/receiver data processor;
an optical source receiving temporal data from said transmitter/receiver data processor;
a polarization modulator receiving spatial data from said transmitter/receiver data processor;
said polarization modulator being connected to said star coupler for distribution of a wavelength multiplexed signals to all of said plurality of other nodes;
a wavelength demultiplexer for extracting a wavelength division multiplexed signal;
a polarization demodulator receiving an output from said wavelength demultiplexer;
a photo-detector receiving an output from said polarization demodulator;
a coupler for distributing a wavelength division multiplexed signal;
whereby each of said nodes distributes a signal at an optical wavelength to the star coupler and it demultiplexes wavelengths from the star coupler, demodulates the polarization and photo-detects received time division multiplexed data streams of spatial and temporal data for delivery to said transmitter/receiver data processor.

28. A method of increasing transmissions through an optical communication network comprising;
time division multiplexing a plurality of data channel inputs into a plurality of temporal and spatial data streams;

providing a plurality of optical sources;
temporally modulating in intensity said plurality of optical sources by said plurality of temporal data streams;
spatially modulating the polarization states of said plurality of temporally modulated optical sources by said plurality of spatial data streams into a plurality of space-time modulated optical signals;
wavelength division multiplexing and demultiplexing said plurality of space-time modulated optical signals;
time division demultiplexing a plurality of space-time demodulated data streams in a pluarlity of receiver data processors;
whereby channel capacity and throughput of said optical communications network is substantially increased.

29. The method according to claim 28 in which said wavelength division multiplexing of said plurality of polarization modulated optical signals comprises;
transmitting wavelength division multiplexed optical signals over a fiber-optic transmission line;
demultiplexing said wavelength division multiplexed optical signals received over said fiber-optic transmission line;
polarization demodulating said plurality of demultiplexed optical signals;
detecting and directly demodulating said plurality of optical signals into spatial and temporal data streams.

30. The method according to claim 28 in which said spatially modulating the polarization states are polarization modulation by a digital modulator.

31. The method according to claim 28 including cross-connecting multiple sets of optical wavelength channels to allow each optical wavelength channel to be used multiple times.

32. The method according to claim 28 wherein temporal modulation by a plurality temporal data streams comprises indirect modulation of said plurality of optical sources in amplitude, phase and/or frequency by said temporal data stream.

33. The method according to claim 29 wherein detecting comprises coherent optical detection using homodyne demodulation.

34. The method according to claim 29 wherein detecting comprises coherent optical detection using heterodyne demodulation.

35. The method according to claim 28 wherein said time division multiplexing of a plurality of channels of an optical communication network comprises time division multiplexing channels of a wavelength division multiplexed ring network.

36. The method according to claim 28 wherein said time division multiplexing of a plurality of channels of an optical communication network comprises time division multiplexing channels of a star coupled optical communication network.

37. The method according to claim 28 wherein said time division multiplexing of plurality of channels of an optical communication network comprises a fiber-optic data bus network.

38. The method according to claim 37 in which said data bus network comprises multiple network interface units operating at a plurality of wavelengths.

* * * * *